(12) United States Patent
Roper

(10) Patent No.: US 6,270,351 B1
(45) Date of Patent: *Aug. 7, 2001

(54) INDIVIDUAL EDUCATION PROGRAM TRACKING SYSTEM

(75) Inventor: Tracy D. Roper, Colorado Springs, CO (US)

(73) Assignee: MCI Communications Corporation, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,745

(22) Filed: Apr. 28, 1998

Related U.S. Application Data

(60) Provisional application No. 60/046,929, filed on May 16, 1997.

(51) Int. Cl.[7] .................................................. G09B 19/00
(52) U.S. Cl. .......................... 434/118; 434/350; 434/362; 434/323
(58) Field of Search ................................. 434/350, 362, 434/118, 323

(56) References Cited

U.S. PATENT DOCUMENTS

| 5,727,950 | * | 3/1998 | Cook et al. ............................ 434/350 |
| 5,904,485 | * | 5/1999 | Siefert ................................ 434/322 X |
| 5,934,909 | * | 8/1999 | Ho et al. ............................ 434/362 X |
| 5,957,699 | * | 9/1999 | Peterson et al. .................. 434/350 X |
| 5,978,648 | * | 11/1999 | George et al. ..................... 434/362 X |
| 6,002,915 | * | 12/1999 | Shimizu ............................ 434/350 X |
| 6,039,575 | * | 3/2000 | L'Allier et al. .................. 434/323 X |
| 6,075,968 | * | 6/2000 | Morris et al. ..................... 434/350 X |

* cited by examiner

*Primary Examiner*—Valencia Martin-Wallace
*Assistant Examiner*—Chanda Harris

(57) ABSTRACT

An individual education program tracking system provides an automated means for creating and administering an entire individual education plan. Embodied in a computer software program and network, the individual education program tracking system enables teachers, school administrators, counselors and parents to enter a student profile, create an individual education plan for the student based on the student's profile, track the student's progress, and perform periodic evaluations and assessments. The individual education program tracking system also automates the completion and submission of various forms as required by a school district or state department of education. The individual education program tracking system integrates and automates procedures that meet a state's or district's legal requirements for administering an individual education plan, such as entry qualification evaluations and parental authorization.

11 Claims, 29 Drawing Sheets

Student Information Screen

Add New Student | Find Student | Add Private Student ◁ ABC ▽ 🗐 Close educationMCI — 500

| | | | |
|---|---|---|---|
| StudentID: | 1106040 | Birthdate: 4/8/92 | M Init: Gender: M ▶ Last: Boop |
| First Name: | Jolene | | |
| Grade: | Kindergart ▶ | Age: 6 | School of Attendance: Chipeta |
| Attendance Area School: | Chipeta | | Primary Handicapping Condition: ▶ |
| Primary Language: | English | | |
| Ethnicity: | White | | Primary Home Language: English |
| | | Initial Date: 17-Dec-97 | Last Tri Date: ▶ |
| Parents Name: | Bill/Peggy Boop | | Type: Parents ▶ |
| Address: | 4810 Creek Drive | | |
| City: | Colorado Springs | State: CO | Zip Code: 80917- |
| Email Address: | | | Company: |
| Home Phone: | (719) 555-5555 | Work Phone: (719) 555-5551 | Fax: |
| Parents Name2: | | | Type: ▶ |
| Address: | | | |
| City: | Colorado Springs | State: CO | Zip Code: |
| Email Address: | | | Company: |
| Home Phone: | | Work Phone: | |
| Health Issues: | | | ☐ Print Parent 2 |
| Notes: | | | |

Record: |◀ ◀ 1 ▶ ▶| of 79

FIG. 5

Referrals/Permissions/Assessments

- Initial Referral — 602
- Initial Assessment Permission — 604
- Notice of Meeting — 606
- Notice of Reassessment — 608
- Staffing Request & Student Data Form — 610 educationMCI

600

| | | | |
|---|---|---|---|
| 1087957 | Brigate | Samantha | 4/28/90 |
| 1074311 | Britz | Alex | 4/28/90 |
| 1096162 | Burrell | Steven | 2/21/90 |
| 1060453 | Carter | Bruce X. | 3/23/87 |
| 1104040 | Chase | Colby D. | 6/5/86 |
| 1076802 | Cobb | Jonathan | 4/23/89 |
| 1100942 | Cortez | Sandra R. | 10/24/85 |
| 1088915 | Darnell | Cameron | 12/11/89 |
| 1089928 | Duram | Daniel | 3/2/90 |
| 1089037 | Herman | Bryan J. | 6/25/90 |
| 1070622 | Johnson | Brian | 1/7/88 |
| 1100061 | Johnson | Jeremy | 11/19/90 |
| 1059899 | Jones | Kyle | 5/18/87 |
| 1061787 | Lamb | Mary | 5/14/86 |
| 1082732 | Lopez | Tiffany L. | 7/11/89 |
| 1062143 | Martinez | Anthony | 6/15/87 |

Click In List to Select Student

Cancel

FIG. 6

Initial Referral

| Print | Cancel |

First Name [Jolene]  Minitial [ ]  Last Name [Boop]

Referral Date: [ ]

What are your concerns and behavioral observations about the student?

Jolene lacks concentration and has difficulty relating well with other students. — 702

What strategies have been tried to improve the situation?

One on one coordinated tutoring by the teacher and peers. — 704

How long were the strategies in place and state the outcomes of these interventions?

3 months — 706

What contacts have been made with the parent/guardian?

Regular notes sent home to parents. — 708

What questions would you like addressed by the assessment team?

Are there vision problems, hearing problems, or possible other learning difficulties — 710

Referred by: [Cindy Morgan] — 712
Position: [Kindergarten Teacher] — 714

| | | |
|---|---|---|
| Colorado Springs<br>School District 11 | Department of Special Education<br>1115 N. El Paso Street<br>Colorado Springs, CO 80903 | Bus  (719) 555-2148<br>FAX  (719) 555-2198<br>TDD  (719) 555-2161 |

INITIAL SPECIAL EDUCATION REFERRAL

Student: Jolene Boop    DOB: 4/8/92    Age: 6    Grade: Kindergarten

Neighborhood School: Chipeta    Student #: 1106040    Gender: M ☑  F ☐

Parent/Guardian: Bill/Peggy Boop      Primary Language:

Address: 4810 Creek Drive Colorado Springs CO 80917-     Home Phone: (719) 555-5555
     Work Phone: (719) 555-5551

REASONS FOR REFERRAL
*800*

Please be specific regarding the following:

1) What are your concerns and behavioral observations about the student?

> Jolene lacks concentration and has difficulty relating well with other students.

2) What strategies have been tried to improve the situation?

> One on one coordinated tutoring by the teacher and peers.

3) How long were the strategies in place and state the outcomes of these interventions?

> 3 months

4) What contacts have been made with the parent/guardian?

> Regular notes sent home to parents.

5) What questions would you like addressed by the assessment team?

> Are there vision problems, hearing problems, or possible other learning difficulties

Referred by: _____    Position: _____Kindergarten Teacher_____
                Cindy Morgan

Principal/Designee: _____    Date Referred: _____

Copy Distribution:    School File    Parent    Central File    Primary Service Provider

FIG. 8

Initial Assessment Permission

```
┌─────────────────────────────────────────────────────────┐
│ Ready to print PERMISSION FOR INITIAL ASSESSMENT FOR    │
│ SPECIAL EDUCATION. Please fill in School Contact.       │
│                                                         │
│         First Name         [Bryan    ]                  │
│         Middle Initial     [J.  ]                       │
│         Last Name          [Herman   ]                  │
│         Name and Title     [Tracy Morgan, Coordinator]  │
│         Telephone Number   [(719) 555-8824  ]           │
│                                                         │
│                    [ Print ]   [ Cancel ]               │
└─────────────────────────────────────────────────────────┘
```

| Colorado Springs | Department of Special Education | Bus | (719) 555-2148 |
| School District 11 | 1115 N. El Paso Street | FAX | (719) 555-2198 |
| *1000* | Colorado Springs, CO 80903 | TDD | (719) 555-2161 |

| STUDENT IDENTIFICATION | | | |
|---|---|---|---|
| Legal Name of Student | Neighborhood School | School of Attendance | Primary Language |
| Jolene Boop | Chipeta | Chipeta | English |
| Date of Birth | Gender M/F | Grade | Student Identification Number |
| 4/8/92 | M | Kindergarten | 1106040 |

PERMISSION FOR INITIAL ASSESSMENT FOR SPECIAL EDUCATION

Dear Bill/Peggy Boop

The district needs your permission to assess your child to determine how the district can more effectively meet his/her educational needs, and if your child is eligible for special education services. School personnel have carefully reviewed your child's educational records and are recommending the assessment to help plan an appropriate educational program. The test/assessments that we propose to use and their purposes are indicated below. All tests will be given in your child's primary language. No single test or individual will determine the educational program. The assessment may include formal and informal tests, observation, parent interviews, student interviews, and consultation with school personnel or other agencies. Your permission is requested to conduct the following assessments:

Functioning Area

| | |
|---|---|
| Cognitive | To assess intellectual functioning (reasoning, judgment, memory, and general knowledge) and perceptual functioning (reception and attending). |
| Social/Emotional | To assess pertinent family history and adaptive behavior (sampling of behaviors in the home, school, and community). |
| Physical | To review health history, current health status, and vision and hearing status. |
| Communicative | To assess sound production/articulation, voice, fluency, and mode of communication. |
| Educational | To review current academic status and educational history, and determine current academic levels of performance. |
| Life Skills | To assess functional life skills and vocational skills in a variety of environments. |

When the assessment is completed, a meeting will be arranged with you to review and discuss the results. You have the right to refuse permission for the assessment. If you do so, the school may request a conference with you to present the reasons for this request and to seek your approval.

If you have any questions, or wish to have a face-to-face conference, please contact:

Name and Title: Cindy Morgan  Telephone Number:

PARENTAL CONSENT

___ YES ___ NO   I authorize the assessments requested.
___ YES ___ NO   I have been informed and understand my rights as a parent.

_____   _____
Signature of Parent or Guardian                Date

Copy Distribution:   School File   Parent   Central File   Primary Service Provider

FIG. 10

Notice of Meeting

| Print | Cancel |
|---|---|

Name: Bryan  J.  Herman
Notice Number: 1  Date Sent: 3/3/97
Date of Meeting: 3/15/97  Meeting Time: 2:00 PM  TYPE: INITIAL ▶
School Contact: Tracy Morgan, Coordinator
Meeting Location: Chipeta Elementary School
Telephone Number: (719) 555-0000

- ☑ Regular Ed Teacher  ☑ Speech/Language  ☐ Occupational/Physical Therapist  ☐ Vision Specialist
- ☑ Principal/Designee  ☐ Social Worker  ☐ School Nurse  ☐ Counselor
- ☐ Student  ☐ Psychologist
- ☐ Special Education Teacher
- ☑ Director/Designee  ☐ Audiologist
- ☐ Other

FIG. 11

| Colorado Springs School District 11 *1200* | Department of Special Education<br>1115 N. El Paso Street<br>Colorado Springs, CO 80903 | Bus (719) 555-2148<br>FAX (719) 555-2198<br>TDD (719) 555-2161 |

| STUDENT IDENTIFICATION | | | |
|---|---|---|---|
| Legal Name of Student | Neighborhood School | School of Attendance | Primary Language |
| Jolene          Boop | Chipeta | Chipeta | English |
| Date of Birth | Gender M/F | Grade | Student Identification Number |
| 4/8/92 | M | Kindergarten | 1106040 |

NOTICE OF MEETING                                                                    1st Notice

Dear   Bill/Peggy Boop

A team of school personnel will meet to review and discuss your student's educational needs. The specific purpose of the meeting is:

TRIENNIAL MEETING TO DETERMINE ELIGIBILITY: The purpose of a triennial review is to discuss the assessments that have been completed, determine whether your student continues to be eligible for special education services, and if eligibility exists, how those services can be provided; and to develop a new IEP for your student.

- ☑ your student's regular education teacher
- ☑ the principal/designee
- ☐ the student, unless student's age or preference of parent indicates otherwise
- ☑ special education teacher
- ☑ the director of special education/designee
- ☐ other
- ☑ a speech/language specialist
- ☐ a school social worker
- ☐ a school psychologist
- ☐ an occupational and/or physical therapist
- ☐ the school nurse    ☐ vision specialist
- ☐ an audiologist    ☐ counselor The meeting is scheduled for _____4/1/97_____ at ___1:00 PM___ at the following location ____Chipeta School Room 10A____ as confirmed by ___Cindy Morgan___ on __22-Apr-98__

Please confirm your attendance to this meeting. Other persons may be invited at your discretion. If the scheduled time and place is not convenient, please contact me immediately so that we can arrange a mutually agreed upon time and location for the meeting. If you are unable to attend, someone will contact you to discuss the results of the meeting. A copy of the completed IEP is available at the conclusion of this meeting. Parent Notice of Legal Rights is printed on the final page of the IEP for your review.

| Name and Title:   Cindy Morgan | Telephone Number:   (719) 555-8824 |

Copy Distribution:     School File     Parent     Central File     Primary Service Provider

FIG. 12

Notice of Reassessment

Ready to print NOTICE FOR REASSESSMENT FOR SPECIAL EDUCATION. Please fill in School Contact.

| | |
|---|---|
| First Name | Bryan |
| Middle Initial | J. |
| Last Name | Herman |
| Name and Title | Tracy Morgan, Coordinator |
| Telephone Number | (719) 555-8824 |

[ Print ]  [ Cancel ]

| Colorado Springs School District 11 | Department of Special Education 1115 N. El Paso Street Colorado Springs, CO 80903 | Bus (719) 555-2148 FAX (719) 555-2198 TDD (719) 555-2161 |

*1400*

| STUDENT IDENTIFICATION |
|---|
| Legal Name of Student    Neighborhood School    School of Attendance    Primary Language |
| Jolene        Boop        Chipeta                                                 English |
| Date of Birth    Gender M/F    Grade        Student Identification Number |
| 4/8/92           M             006          1106040 |

NOTICE OF REASSESSMENT TO DETERMINE ELIGIBILITY

Dear Bill/Peggy Boop

Federal law requires a multidisciplinary assessment of students with disabilities every three years to redetermine eligibility. The tests that we propose to use and their purposes are indicated below. All tests will be given in your child's primary language. No single test or individual will determine the educational program. The assessments may include formal and informal tests, observation, parent interviews, student interviews, and consultation with school personnel or other agencies.

Functioning Area

| | |
|---|---|
| Cognitive | To assess intellectual functioning (reasoning, judgment, memory, and general knowledge) and perceptual functioning (reception and attending). |
| Social/Emotional | To assess pertinent family history and adaptive behavior (sampling of behaviors in the home, school, and community). |
| Physical | To review health history, current health status, and vision and hearing status. |
| Communicative | To assess sound production/articulation, voice, fluency, and mode of communication. |
| Educational | To review current academic status and educational history, and determine current academic levels of performance. |
| Life Skills | To assess functional life skills and vocational skills in a variety of environments. |

When the assessment is completed, a meeting will be arranged with you to review and discuss the results.

A parent's rights document is attached to this form. If you have any questions, please contact me at the number below.

Name and Title: Cindy Morgan                                Telephone Number: (719) 555-8824

Copy Distribution:    School File    Parent    Central File    Primary Service Provider

FIG. 14

Staffing Report & Student Data Form

1500

| Print | Cancel |

StudentID: 1106040
First Name: Jolene  Minitial:  Last Name: Boop
Birthdate: 4/8/92  Gender: M  Grade: Kindergarten ▼
School: Chipeta ▼  Service Begin Date: 12/17/97

New Student to this school, ☐
former Dist. 11 School is:

New Student in Special ☑
Education in Dist. 11

Carry-over Special ☐
Education student in Dist. 11

Tuition Student from another ☐
district. Which district?

Primary Handicap Condition: Hearing Disability ▼
Ethnic: White ▼
Setting Code: Center or Other School/Outside Ge ▼

STAFF PROVIDER NUMBERS

| | | | |
|---|---|---|---|
| Primary Service Provider: | 188 | Secondary Provider #4: | 0 |
| Secondary Provider #1: | 126 | Secondary Provider #5: | 0 |
| Secondary Provider #2: | 0 | Secondary Provider #6: | 0 |
| Secondary Provider #3: | 0 | Secondary Provider #7: | 0 |

FIG. 15

COLORADO SPRINGS PUBLIC SCHOOLS
Department of Instruction
STAFFING REPORT AND STUDENT DATA FORM (Form 3)

*1600*

Service Start Date: [ 12/17/97 ]     [ 109 ] Chipeta     [ 006 ] Kindergarten     [ 1106040 ]
                                     School No.          Grade                    StudentID
Today's Date: [ 4/22/98 ]

☐ New Student to this
  school, former Dist.
  11 School is:
  [                ]

☐ New Student in Special
  Education in Dist. 11

☐ Carry-over Special Education
  Student in Dist. 11

☐ Tuition Student from
  another district. Which
  district?
  [                ]

[ Boop ]    [        ]    [ Jolene ]
Legal Name (Last Name, First Name, Middle Initial)

[ 4/8/92 ]              [ M ]               [ 5 ] White
Birthdate                Sex                 Ethnic

[ 0 ]                                       [        ]
Setting                                      Primary
                                             Handicap
                                             Condition

| | | | |
|---|---|---|---|
| Primary Service Provider: | 0 | Secondary Provider #4 | 0 |
| Secondary Provider #1 | 0 | Secondary Provider #5 | 0 |
| Secondary Provider #2 | 0 | Secondary Provider #6 | 0 |
| Secondary Provider #3 | 0 | Secondary Provider #7 | 0 |

Copy Distribution   Central Office          Central Office              School File
                    After Initial Staffing  At Departure and/or
                                            End of Year                 Form No. 88393 - Rev. 7/96

FIG. 16

Create/Edit/View IEP

| Last Name | First Name | Mi | Last IEP Ty | Last IEP Date |
|---|---|---|---|---|
| Brigate | Samantha | | ANNUAL | 4/2/97 |
| Britz | Alex | | ANNUAL | 4/2/97 |
| Burrell | Steven | | INITIAL | 4/10/97 |
| Carter | Bruce | X. | INITIAL | 5/1/97 |
| Chase | Colby | D. | INITIAL | 5/8/97 |
| Cobb | Jonathan | | INITIAL | 3/4/97 |
| Cortez | Sandra | R. | INITIAL | 5/1/97 |
| Darnell | Cameron | | INITIAL | 5/1/97 |
| Duram | Daniel | | ANNUAL | 4/17/97 |
| Herman | Bryan | J. | INITIAL | 5/1/97 |
| Johnson | Brian | | TRI-ANNUAL | 2/24/97 |
| Johnson | Jeremy | | ANNUAL | 4/8/97 |
| Jones | Kyle | | ANNUAL | 3/13/97 |
| Lamb | Mary | L. | INITIAL | 5/1/97 |
| Lopez | Tiffany | | INITIAL | 3/4/97 |

Click In List to Select Student

Cancel

- Creat New Intitial — 1702
- Create New Annual — 1704
- Create New Triennial — 1706
- Edit Current IEP — 1708
- LOCK THIS IEP — 1710 educationMCI

Create New Initial

| Legal Name: Bryan J. Herman | | | IEP Date 5/12/97 |
|---|---|---|---|
| Check Sigs (1912) | ✓ (1914) | Save Record (1906) | Print IEP Form (1908) | Close Form (1910) | educationMCI |

1900, 1902

Initial: ✓ (1904)  Annual: ☐  Tri_Annual/Re-evaluation: ☐

Educational Level of Functioning:  8 Lines of Text

Basic

Instrument Used:                              Completed By:

Other - Specify:                              Date Completed:
                                              Completed By:
Other Instrument Used:
                                              Date Completed:

Cognitive Level of Functioning:    8 Lines of Text

Instrument Used:

Completed By:    Date Completed:

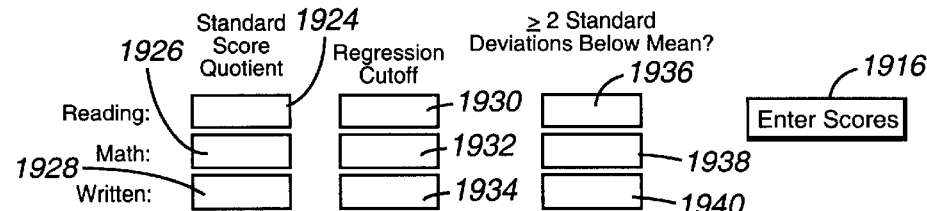

|  | Standard Score Quotient (1926, 1924) | Regression Cutoff | ≥ 2 Standard Deviations Below Mean? | Enter Scores (1916) |
|---|---|---|---|---|
| Reading: |  | 1930 | 1936 |  |
| Math: (1928) |  | 1932 | 1938 |  |
| Written: |  | 1934 | 1940 |  |

Are PC Indicative Behaviors present?  ☐ Yes  ✓ No  ☐ N/A

Cognitive: FS IQ or Equivalent [ ]  VIQ or Equivalent [ ]  PIQ or Equivalent [ ]
Use to Qualify:  ☐ FS IQ    ☐ V IQ    ☐ P IQ Is the difference between VIQ and PIQ significant at the .05 level?  ✓ Yes  ☐ No Communications Level of Functioning:    8 Lines of Text

FIG. 19a

Instrument Used:
Completed By: Date Completed:
Communication Rating:
Social / Emotional Level of Functioning: 8 Lines of Text Instrument Used:
Completed By: Date Completed:
Adaptive Behavior: Is adaptive behavior significantly below cultural expectations? ☐ Yes ☐ No ☐ N/A
Physical / Health Level of Functioning: 8 Lines of Text Instrument Used:
Completed By: Date Completed:
Physical: Vision Screening ☑ Pass ☐ Fail   Hearing Screening ☑ Pass ☐ Fail
Other - Specify:
Other Instrument Used:
Completed By: Date Completed:
Vocational / Transitional / Interest Level of Functioning: 8 Lines of Text Instrument Used:
Completed By: Date Completed:      STOP
                                    *1922*
Educational Needs: 13 Lines of Text Are the assessments of sufficient scope and intensity to make staffing decisions? ☑ Yes ☐ No

FIG. 19b

As defined in the Exceptional Children's Education Act, is this student unable to receive reasonable education benefit from ☑ Yes ☐ No  [STOP] 1922

☐ Significant Limited Intellectual Capacity ☐ Vision Disability ☐ Multiple Disability (SLIC/
☐ Significant Identifiable Emotional Disability ☐ Speech/Language
☐ Perceptual or Communicative Disability ☐ Deaf/Blind ☐ Preschool with disability (age 3 through 5)
☐ Hearing Disability ☐ Physical Disability
☐ Autism ☐ Traumatic Brain Injury Describe Determination of Eligibility: 4 Lines of Text

[text box]

1918 [Fill in Goals]     1920 [Fill in Services]

Placement Alternative Considered (Check all that apply):

☐ Regular Education with supports/modifications ☐ Special Classes (Resources) ☐ Community Services (Transition)
☐ Special Programs (District-Centered Programs) ☐ Out of District ☐ N/A Recommended Placement in Least Restrictive Environment (Check One):

☑ Regular Education with supports/modifications ☐ Special Classes (Resources) ☐ Community Services (Transition)
☐ Special Programs (District-Centered Programs) ☐ Out of District ☐ Home/Hospital ☐ N/A All special education and related services can be satisfactorily accomplished in the regular education classroom.    ☐ Yes ☑ No ☐ N/A Rationale: 4 Lines of Text

[text box]    [STOP] 1922

Hours out of regular education: [ 0 ]    Percentage of time in regular education: [  ]

Is this student eligible for Extended School Year services?  ☐ Yes ☑ No ☐ N/A
☐ To be determined at a staffing by the end of

FIG. 19c

Create New Annual

| Save Record | Print IEP Form | Close IEP | educationMCI |

Legal Name: Daniel Carter    IEP Date: 12/18/97

Check Sigs  ✓

Initial: ☐    Annual: ☑    Tri_Annual/Re-evaluation: ☐

Educational Level of Functioning:        8 Lines of Text

> Danny has made some good improvement in math skills this year. Math is an area of strength for him. He does need assistance with reading the word problems in math. Over the summer, regression in reading skills was noted. He has been making progress with basic sight words and reading fluency. He is now able to identify 77 out of the first 100 Johnson sight words. At the first level of the informal reading inventory, his reading accuracy has gone from 46% correct Cognitive Level of Functioning:        8 Lines of Text Communications Level of Functioning:        8 Lines of Text Social / Emotional Level of Functioning:        8 Lines of Text Physical / Health Level of Functioning:        8 Lines of Text > Daniel passed hearing and vision screening. He states that he is taking a "thinking pill" in the morning only. He recently had his tonsils out. His mother is currently in the hospital recovering from surgery, and he misses her.

Vocational / Transitional / Interest Level of Functioning:    8 Lines of Text

STOP

Educational Needs:        13 Lines of Text

FIG. 20a

Create New Annual (Continued)

*2018* *2020*

[ Fill in Goals ]  [ Fill in Services ]

Placement Alternative Considered (Check all that apply):

- ☑ Regular Education with supports/modifications
- ☐ Special Classes (Resources)
- ☐ Community Services (Transition)
- ☐ Special Programs (District-Centered Programs)
- ☐ Out of District

Recommended Placement in Least Restrictive Environment (Check One):

- ☑ Regular Education with supports/modifications
- ☐ Special Classes (Resources)
- ☐ Community Services (Transition)
- ☐ Special Programs (District-Centered Programs)
- ☐ Out of District
- ☐ Home/Hospital All special education and related services can be satisfactorily accomplished in the regular education classroom.    ☐ Yes ☑ No ☐ N/A Rationale:    4 Lines of Text

[ STOP ]
*2022*

Hours out of regular education: [ 0 ]    Percentage of time in regular education: [ ]

Is this student eligible for Extended School Year services?
☐ Yes ☑ No ☐ N/A
☐ To be determined at a staffing by the end of current school year.

FIG. 20b

Create New Triennial/Reassessment

| Legal Name: | Brian O'Neil | | IEP Date | 2/20/97 |

[ Check Sigs ] [✓] [ Save Record ] [ Print IEP Form ] [ Close Form ]   educationMCI 2112   2114   2106   2108   2110   /2100, 2102

Initial: ☐   Annual: ☐   Tri_Annual/Re-evaluation: ☑
2104

Educational Level of Functioning:    8 Lines of Text

Brian was given the Woodcock-Johnson Tests of Achievement on 1/16/97. Brian scored a 100 on the reading sub-tests, a 97 on the math sub-tests, and an 85 on the written language sub-tests. He has good word recognition, but has more difficulty with passage comprehension. On the calculation sub-test, Brian had difficulty with basic multiplication problems, subtraction with regrouping, and addition with decimals. He did better solving practical Instrument Used:
Woodcock-Johnson Test of Achievement-R Completed By: Shannon Lange   Date Completed: 1/16/97

Other - Specify:    Completed By:

Other Instrument Used:   Date Completed:

Cognitive Level of Functioning:    8 Lines of Text

Brian demonstrates average to above average ability. There is a significant discrepancy between his verbal and nonverbal abilities. His verbal skills are high average. He has difficulty with short-term, auditory memory and visual-spatial skills. His visual-spatial skills improve when the end result is presented as a visual cue. Common sense in social situations is a relative strength.

Instrument Used: WISC-III, File review, Observation

Completed By: Lynn Hartley   Date Completed: 2/6/97

☑ Eligibility Done?

|  | Standard Score Quotient 2124 | Regression Cutoff | ≥ 2 Standard Deviations Below Mean? 2136 | |
|---|---|---|---|---|
| Reading: | 97 | 0 —2130 | NO | [Enter Scores] 2116 |
| Math: | 91 | 0 —2132 | NO —2138 | |
| Written: | 82 | 0 —2134 | NO —2140 | |

2126   2128

Are PC Indicative Behaviors present?  ☑ Yes  ☐ No  ☐ N/A

Cognitive: FS IQ or Equivalent [97]  VIQ or Equivalent [107]  PIQ or Equivalent [86]

Use to Qualify:  ☐ FS IQ   ☐ V IQ   ☐ P IQ

Is the difference between VIQ and PIQ significant at the .05 level?  ☑ Yes  ☐ No 8 Lines of Text

FIG. 21a

Communications Level of Functioning:          8 Lines of Text

| CELF-R Receptive Language Score-87, Expressive Language Score-78, Total Language Score-81, EOWPVT-R completed in Feb. of 1996, showed that Brian's expressive vocabulary standard score was 99, up from 79 on the previous test. Articulation is within normal limits. Brian's receptive and expressive language scores are below average, with expressive language lower than receptive language. Attention is a concern. |
|---|

Instrument Used: CELF-R, EOWPVT-R, articulation screening

Completed By: D. Munson     Date Completed: 1/29/97

Communication Rating: 2

Social / Emotional Level of Functioning:          8 Lines of Text

| According to the Burks Behavior rating scale there are significant concerns in the school setting including academics, attention, poor impulse control, aggressiveness, confidence, identity, social conformity, coordination, anger control and getting along with peers. Parental concerns were in the areas of academics, poor impulse control, aggressiveness, attention, social conformity, confidence, identity, relating to others. |
|---|

Instrument Used: Burks Behavior Rating Scale, student and teacher interview, social devel. history Completed By: Kim Hoekert     Date Completed: 1/26/97

Adaptive Behavior: Is adaptive behavior significantly below cultural expectation?    ☐ Yes ☐ No ☒ N/A Physical / Health Level of Functioning:          8 Lines of Text

| Breathing problems, needing oxygen at birth, due to the presence of a severe congenital heart defect, Tetrology of Fallot. Open heart surgery at age 11 mos. No physical restrictions. Generally healthy boy with good color and good motor skills. Chronic nasal congestion, according to staff. Unremarkable physical exam except for a loud hear murmur. |
|---|

Instrument Used: Record Review, Physical Examination

Completed By: Kate Tangney     Date Completed: 2/26/97

Physical: Vision Screening [☒ Pass ☐ Fail]    Hearing Screening [☒ Pass ☐ Fail]

Other - Specify:

Other Instrument Used:

Completed By:     Date Completed:

Vocational / Transitional / Interest Level of Functioning:          8 Lines of Text

| Brian enjoys playing football, building models, roller blading, playing baseball, playing outdoors with friends and playing with micromachines. |
|---|

Instrument Used:

Completed By: Kim Hoekert     Date Completed: 1/26/97      STOP
                                                                                                                                       2122

Educational Needs:          13 Lines of Text

| Multi-sensory approach to learning along with a hands on experiential approach, frequent checks for understanding, improve ability to formulate sentences in oral and written form, improve organizational skills, increase attention and concentration, improve the quality of work. Needs lots of redirection and cues to pay attention. Continue to work on fine motor skills. Improve quality of written work. Improve relationships with peers. Improve home to school communication as well as homework completion. |
|---|

Are the assessments of sufficient scope and intensity to make staffing decisions?    ☒ Yes ☐ No

FIG. 21b

As defined in the Exceptional Children's Education Act, is this student unable to receive reasonable education benefit from    ☑ Yes ☐ No    [STOP] 2122

☐ Significant Limited Intellectual Capacity    ☐ Vision Disability    ☐ Multiple Disability (SLIC/ [____])
☐ Significant Identifiable Emotional Disability    ☐ Speech/Language    ☐ Preschool with disability (age 3 through 5)
☑ Perceptual or Communicative Disability    ☐ Deaf/Blind    ☐ Physical Disability
☐ Hearing Disability    ☐ Autism    ☐ Traumatic Brain Injury Describe Determination of Eligibility:  4 Lines of Text His scores fall in the regression cut off, P/C indicative behaviors are present, and the exclusionary clause does not apply.

2113 [Fill in Goals]    [Fill in Services] 2120

Placement Alternative Considered (Check all that apply):

☑ Regular Education with supports/modifications    ☑ Special Classes (Resources)    ☐ Community Services (Transition)
☐ Special Programs (District-Centered Programs)    ☐ Out of District    ☐ N/A Recommended Placement in Least Restrictive Environment (Check One):

☑ Regular Education with supports/modifications    ☑ Special Classes (Resources)    ☐ Community Services (Transition)
☐ Special Programs (District-Centered Programs)    ☐ Out of District    ☐ Home/Hospital    ☐ N/A All special education and related services can be satisfactorily accomplished in the regular education classroom.    ☑ Yes ☐ No ☐ N/A Rationale:  4 Lines of Text Because of attention and concentration issues and his degree of distractibility, his services need to be delivered in a quiet environment away from the classroom.    [STOP] 2122

Hours out of regular education: [ 6 ]    Percentage of time in regular education: [ 81 ]

Is this student eligible for Extended School Year services?    ☐ Yes ☑ No ☐ N/A
☐ To be determined at a staffing by the end of

FIG. 21c

Signatures (same for all IEP input processes)

```
┌─────────────────────────────────────────────────────────────┐
│ [Close]   [Print IEP Form]                                   │
│                  ╱2204                                       │
│  First Name [Bryan]   Minitial [J.]   Last Name [Herman]     │
│  Birthdate  [6/25/90]─2206                                   │
│                          2202                                │
│  Signature 1  [Doris Levitz]      Signature 9  [John Johnson]│
│  Signature 2  [Mary Lamb]         Signature 10 [Jon Miller]  │
│  Signature 3  [          ]        Signature 11 [          ] │
│  Signature 4  [          ]        Signature 12 [          ] │
│  Signature 5  [          ]        Signature 13 [          ] │
│  Signature 6  [          ]        Signature 14 [          ] │
│  Signature 7  [          ]        Signature 15 [          ] │
│  Signature 8  [          ]        Signature 16 [          ] │
│  Director/Designee [Karne Singer] Principal/Designee [Jim Jennings]│
└─────────────────────────────────────────────────────────────┘
```
2200

FIG. 22

Woodcock-Johnson Score Conversion (same for Initial and Triennial IEP processes)

```
┌─────────────────────────────────────────────────────────────┐
│ [Return to IEP]─2312                                         │
│                                                              │
│         [863476097] 2316                                     │
│  StudentID: [11089037]                         2314    2300  │
│  NAME:      [Bryan J. Herman]                                │
│  Basic Reading Cluster: 2302─[  50  ]  [  1  ]─2304          │
│  Reading Comprehension Cluster: [ 70 ]  [  4  ]─2304         │
│                    2302─╱  SUM: [  5  ]─2304    2306         │
│              2302 Standard Score Quotient + Table: [ 55 ]    │
│  Basic Math Skills Cluster:   [  60  ]  [  2  ]─2304         │
│  Math Reasoning:              [  45  ]  [  1  ]─2304         │
│                    2302    SUM: [  3  ]─2304    2308         │
│              2302 Standard Score Quotient + Table 2: [ 52 ]  │
│  Basic Writing Skills:        [  88  ]  [  7  ]─2304         │
│  Written Expression:          [ 100  ]  [ 10  ]─2304         │
│                    2302    SUM: [ 17  ]─2304    2310         │
│                 Standard Score Quotient + Table 2: [ 91 ]    │
└─────────────────────────────────────────────────────────────┘
```

FIG. 23

Goals (same for all IEP input processes) — 2400

| ✓ | Add New Goal | Delete Goal | Return to IEP — 2404 |

2402  2406

Kyle Jones

Annual Goal: Improve reading, spelling and written language skills.

Delete Current Objective

| Short-Term Instructional Objectives | Start Date | Eval Method | Progress | Does objective need to be Carried over to new IEP, Modified, or Discontinued |
|---|---|---|---|---|
| a. Use of spelling dictionary when doing writing and editing projects 9/10 times. | 3/13/97 | 2,4 | | |
| b. Will continue to develop and use strategies for reading unknown words. | 3/3/97 | 1,2,3,4, | | |

Record: |◄◄| ◄| 1 |►|►►| of 6

Services (same for all IEP input processes) — 2500

| Return to IEP | ✓ | | STOP | | |

2502

| Services | Type(s) of Provider(s) | Time/Week | Begin Date | End Date |
|---|---|---|---|---|
| Service 1 | Reg. Ed., Sped | 2 hrs | 3/3/97 | 3/3/98 |
| Service 2 | Sped | 1 hr | 3/3/97 | 3/3/98 |
| | | | | |

Transportation as a related service? ☐ Yes ☑ No

FIG. 25

Print IEP (same for all IEP input processes)

| |
|---|
| Select as needed:<br>☑ Print Page 1<br>☑ Print Page 2<br>☑ Print Page 3<br>☑ Print Page 4<br>☑ Print Page 5<br>☑ Print Page 6<br>☑ Print Parent Rights<br><br>[ Print ]   [ Cancel ] |

FIG. 26 ical skills, emotional development, and/or any other area of
INDIVIDUAL EDUCATION PROGRAM TRACKING SYSTEM This application claims the benefit of U.S. Provisional Application No. 60/046,929 filed on May 16, 1997.

BACKGROUND OF THE INVENTION

1. Field of the Invention

The present invention relates to an automated system for creating and administering individual education plans, and more particularly to a software package and network for creating individual education plans based upon student profiles and monitoring/assessing the progress and status of the students in the plans.

2. Discussion of the Related Art

Public and private elementary, middle and high schools are mandated by their respective state and federal government to offer individualized education plans to meet the needs of students, including gifted and talented students, English as a Second Language students, literacy program students, Title I program students and students with learning disabilities. The individualized plans provide services that are tailored to the specific needs of students. For example, a student may require special attention in areas such as reading, writing, mathematics, speech, social skills, physical skills, emotional development, and/or any other area of special need. Similarly, a student may excel beyond his/her peers in one or more particular area and thus require special attention to provide this student with educational or other challenges thereby allowing this student to fully develop his or her potential to the fullest extent possible. For example, specialized services may be offered in areas including music, art and athletic programs.

Preferably, an individual education plan is designed as a collaborative effort with the input of school administrators, counselors, teachers and of the parents or guardian of the particular student. Typically, in any individual education plan, parental or guardian authorization is required. In addition, there is usually an entry qualification process to determine if a student's particular needs or gifts qualify that student for a particular plan. Qualification criteria are often designated by a state board of education. Periodic evaluations and assessments of a student's skills, needs and progress are also part of an overall individual education plan.

Currently, the entire process of creating and administering an individual education plan is accomplished manually. Essentially, this involves many individuals manually completing a myriad of forms, tracking the student's progress in the plans, and continuously monitoring the needs and skills of the students in the plans. Paper copies of the forms are sent to supervisors for approval once a staffing meeting has taken place. If there is an error, the forms are returned to the school and a new set must be produced. The new paper copy, with a notation as to what changed and why, is forwarded to all appropriate school personnel and to the parents/guardian of the particular student. This process could extend the life cycle of the individual education plan creation by a week. Essentially, as seen by the above example, this endeavor requires significant time and effort on the part of teachers, school administrators and counselors as well as the parents (guardian) of the student. In addition to the demand of time on the individuals involved, the manual control of this process may be prohibitively expensive. Accordingly, there is a need to enhance the efficiency of and reduce the cost of maintaining individual education plans.

SUMMARY OF THE INVENTION

In accordance with one aspect, the present invention is directed to a method for administering individual education plans. The method comprises generating student information records for students being considered for participation in an individual education plan, creating individual education plan records for each student based upon predetermined qualification criteria, and generating forms and reports for implementing individual education plans for qualified students. The method for administering individual education plans also comprises assessing students progress in individual education plans.

The individual education program tracking system of the present invention provides an automated means for creating, administering and maintaining individual education plans. Individual education plans, as the name implies, are plans designed to meet the special needs of individual students. These students, by virtue of a specific talent or gift, or because of a disability, have needs that cannot be fully met by the mainstream educational system. Embodied in a computer software package and network, the individual education program tracking system enables school administrators, school counselors, teachers and parents to develop a new or modify an existing student profile, create a new or modify an existing individual plan for the student based upon the profile and track the student's progress in the plan through periodic evaluations and assessments. The individual education program tracking system also provides for the automated completion and submission of the various forms required by either or both local school districts and state departments of education. Essentially, the individual education program tracking system integrates and automates procedures that meet a state's and/or district's legal requirements for administering an individual education plan, such as entry qualification evaluations and parental (guardian) authorization.

The individual education program tracking system of the present invention provides a network and means for each school in a school district to track the individual education plans for the students of that school and submit the data to the school district's central office. The system may also be utilized to compile the data from each of the schools in the district. The compiled data may then be utilized for any number of purposes including statistical analysis of the various aspects of the individual education programs and budget allocation. The system may also be utilized to submit the compiled data from each school district to the state's board of education wherein similar analyses may be done.

The individual education program tracking system of the present invention provides for the standardization of the individual education process at the school, school district and state board of education level. It increases the speed in obtaining and completing the forms necessary to create and administer the plans, and it greatly increases the efficiency of the analysis of the data compiled.

The individual education program tracking system of the present invention provides a user-friendly interface operable on any computing system such as personal computers. The system is highly configurable/reconfigurable to fit the needs of gifted/talented children as well as challenged children. Accordingly, teachers, school administrators and counselors may easily and efficiently create and edit data for student profiles and individual education plans, thereby saving time, effort and money in the creation and administration of individual education plans.

BRIEF DESCRIPTION OF THE DRAWINGS

FIG. 5 is an exemplary Student Information screen in accordance with the present invention.

FIG. 6 is an exemplary Referrals/Permission/Assessments screen in accordance with the present invention.

FIG. 7 is an exemplary Initial Referral screen in accordance with the present invention.

FIG. 8 is an exemplary Initial Referral form in accordance with the present invention.

FIG. 9 is an exemplary Initial Assessment Permission screen in accordance with the present invention.

FIG. 10 is an exemplary Initial Assessment Permission form in accordance with the present invention.

FIG. 11 is an exemplary Notice of Meeting screen in accordance with the present invention.

FIG. 12 is an exemplary Notice of Meeting form in accordance with the present invention.

FIG. 13 is an exemplary Notice of Reassessment screen in accordance with the present invention.

FIG. 14 is an exemplary Notice of Reassessment form in accordance with the present invention.

FIG. 15 is an exemplary Staffing Report & Student Data Form screen in accordance with the present invention.

FIG. 16 is an exemplary Staffing Report & Student Data Form in accordance with the present invention.

FIG. 17 is an exemplary Create/Edit/View IEP screen in accordance with the present invention.

FIG. 18 is an exemplary Student Information screen in accordance with the present invention.

FIG. 19 is an exemplary Create New Initial screen in accordance with the present invention.

FIG. 20 is an exemplary Create New Annual screen in accordance with the present invention.

FIG. 21 is an exemplary Create New Triennial/Reassessment screen in accordance with the present invention.

FIG. 22 is an exemplary Signature screen in accordance with the present invention.

FIG. 23 is an exemplary Score Conversion screen in accordance with the present invention.

FIG. 24 is an exemplary Goals screen in accordance with the present invention.

FIG. 25 is an exemplary Services screen in accordance with the present invention.

FIG. 26 is an exemplary Print IEP screen in accordance with the present invention.

DETAILED DESCRIPTION OF THE PREFERRED EMBODIMENTS

Figure 1:
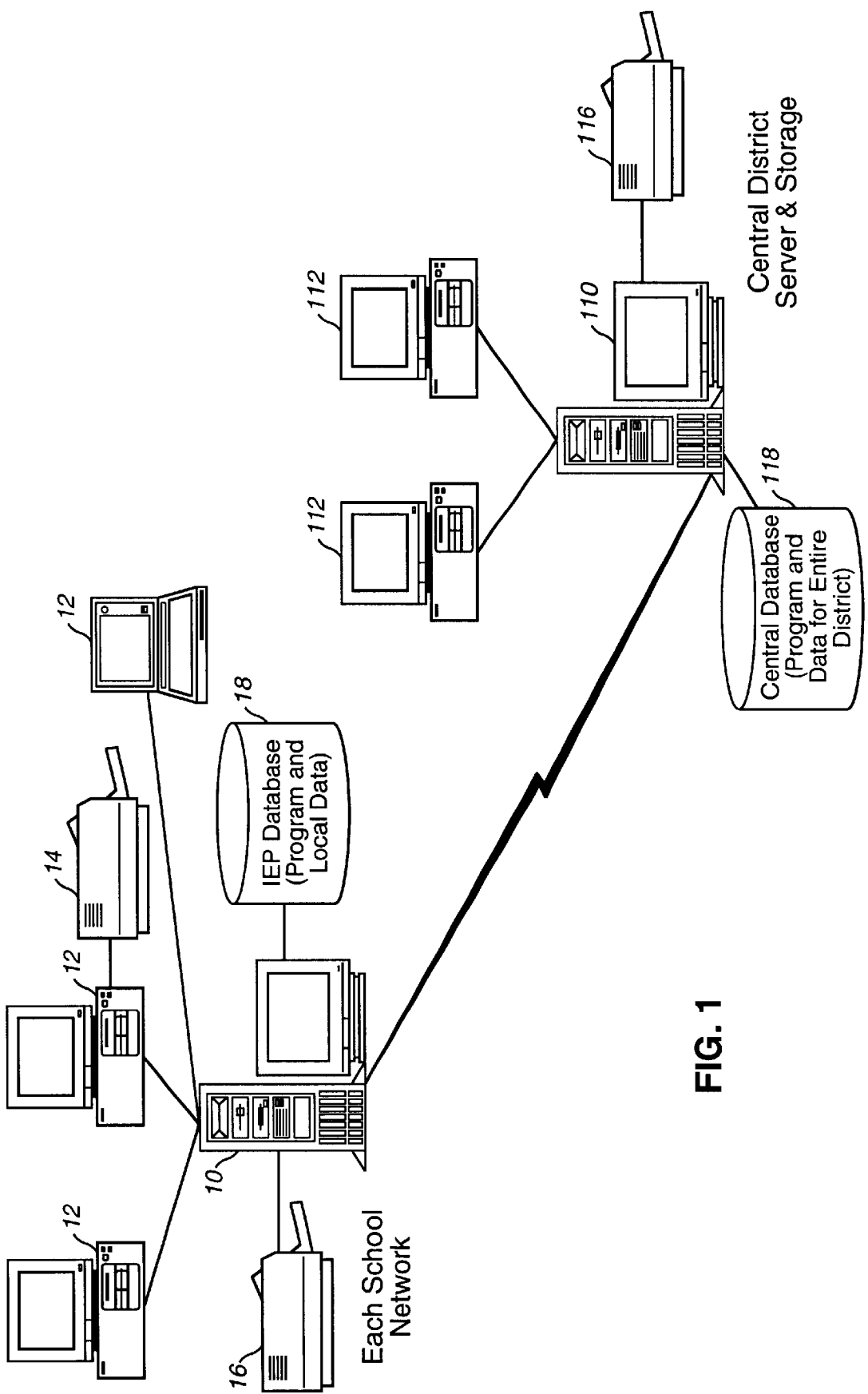
FIG. 1 is a block diagram representation of the individual education program tracking system of the present invention.

The individual education program tracking system of the present invention comprises a method and network for creating, administering and maintaining individual education plans. FIG. 1 illustrates an exemplary network architecture for implementing the individual education program tracking system of the present invention. Each school in a school district has a network that includes an individual education program tracking system server 10. The server 10 may comprise any suitable computer, such as a personal computer or mid-range computer. The network also preferably comprises one or more client computers 12 which may be utilized to run various client applications, client printers 14 connected to the client computers 12, and a network printer 16 connected to the server 10. The client computers 12 may comprise any suitable computer, including desktop personal computers and laptop computers. The client printers 14 and the network printer 16 may comprise any suitable printer and in a preferred embodiment are laser printers for producing high quality prints. The various components comprising the network may be interconnected in any suitable manner. In a preferred embodiment, the components are connected utilizing a local area network configuration.

In an alternate embodiment, the individual education program tracking system may preferably include a single server 10 running as a Structured Query Language, SQL, server and Web Server in the district. Client computers 12 would be connected to the Intranet and use browser software to manipulate the central database or could dial in to access the system. Client computers 12 would be connected to a local or network printer 16. The individual education plan record for a specific student may be checked out by the user for update and checked back in at a later time. Checked out records will be flagged with the user's name, school, checkout date, and checkout time so that other users will know who has the record. Should the checked out record be destroyed or lost, the system administrators will reset the system to use the previous version of the record.

The individual education program tracking system is preferably embodied in a software package which may be run on the individual education program server 10. The individual education program tracking system comprises an individual education program database 18 that includes all pertinent student information and individual education program records. The content of this information is discussed in detail subsequently. The individual education program database 18 may reside in a storage facility of the server 10 or an attached computer. Users may access the individual education program tracking system directly through the server 10 or over the network utilizing the one or more client computers 12.

In accordance with one exemplary embodiment of the present invention, a school district's central administrative office may be equipped with a similar or identical network to that of the individual schools as described above. The district's central administrative office network comprises an individual education program tracking system server 110, one or more client computers 112, one or more client printers 114, a network printer 116 and a central database 118 which includes the data for the entire district. In accordance with this exemplary embodiment of the invention, the servers 10 in each of the schools comprising the particular school district may perform periodic transmissions of the data in their respective individual education program databases 18 to the district's central administrative individual education program tracking system server 110. The periodic transmissions may occur at any suitable interval including daily, weekly, monthly and yearly. This process allows the district's central administrative office to roll-up individual education plan data from all schools in the district and compile statistical data or review records. The district's central administrative office may also perform a transmission of individual education plan data from all of its schools to a state's central administrative office.

Individual education plans are plans designed to meet the special needs of individual students. The individual education program tracking system of the present invention provides an automated means for creating, administering and maintaining individual education plans. Individual education plans may vary from one location to another and the process for creating, administering and maintaining programs may also vary from one location to another; however, a typical process is set forth below in order to better set forth exemplary embodiments of the present invention.

Prior to being considered for an individual education plan, student profiles are created. Student profiles generally comprise all pertinent information such as the student's full name, address, phone number, the names of the student's custodial parents or guardian, the name and address of non-custodial parents, the school which the student attends, and the school responsible for furnishing special education services to the student. A regular education teacher, based on various criteria, makes an initial referral for a student to be considered for an individual education plan. Essentially, the initial referral requests that a student be evaluated for an individual education plan and sets forth the reasons for the referral. Once a referral is made, a New Initial Individual Education Program form is created to track the rest of the process. Parental permission is required for a student to be considered for entry into an individual education plan. Accordingly, the student's teacher or a school administrator completes an Initial Assessment Permission form for the parents to sign. Essentially, this form, when signed, gives permission for an evaluation of the student to take place. Once permission is obtained and qualification testing is complete, a staffing meeting is scheduled. The staffing meeting is utilized to determine a student's eligibility for an individual education plan. Attendees of a staffing meeting include parents, teachers, and other professionals as may be required. The staffing meeting results in an official printed copy of the Initial Individual Education Program form stating the student's eligibility for individual education plan services. Once the student's eligibility is approved, individual education plan services are provided to the student. Annual reassessments are performed to track the student's progress in the plan. Prior to each annual reassessment, a teacher or school administrator completes a Notice of Reassessment form to send to the student's parents to inform them that their child is being reassessed for individual education plan services. The results of annual reassessments are recorded in a New Annual Individual Education Program form. Triennial reassessments are performed to re-evaluate the student's eligibility for the individual education plan. Prior to each reassessment, a teacher or school administrator completes a Notice of Reassessment form to send to the parents. The results of triennial reassessments are recorded in a New Triennial Individual Education Program form. Every time a student moves, and at the end of each school year, a teacher or school administrator completes a Staffing Report and Student Data form. The report and form are then submitted to the district and state for demographic data compilation and review.

Figure 2:
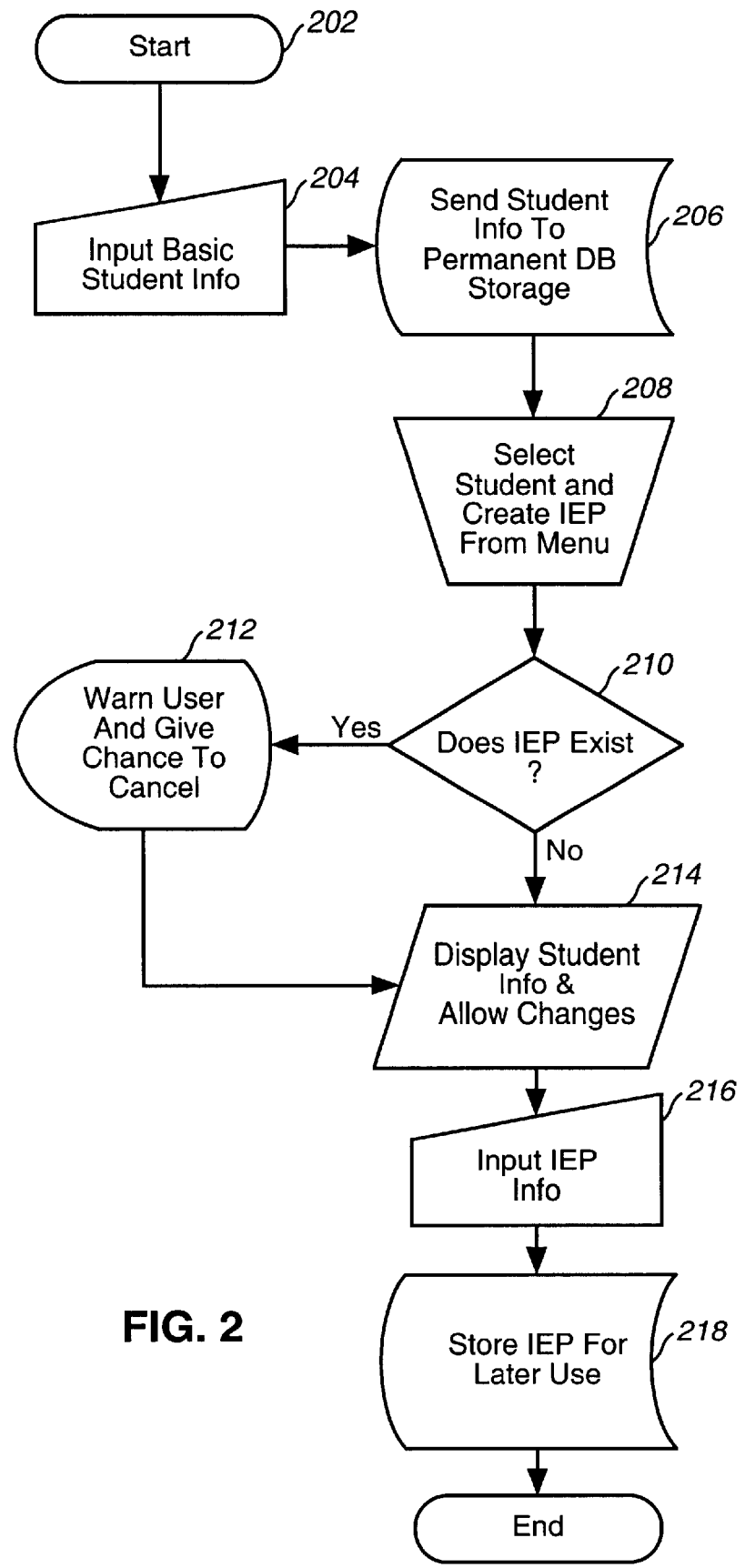
FIG. 2 is a flow chart of the logic for creating a new individual education plan in accordance with the present invention.
Figure 4:
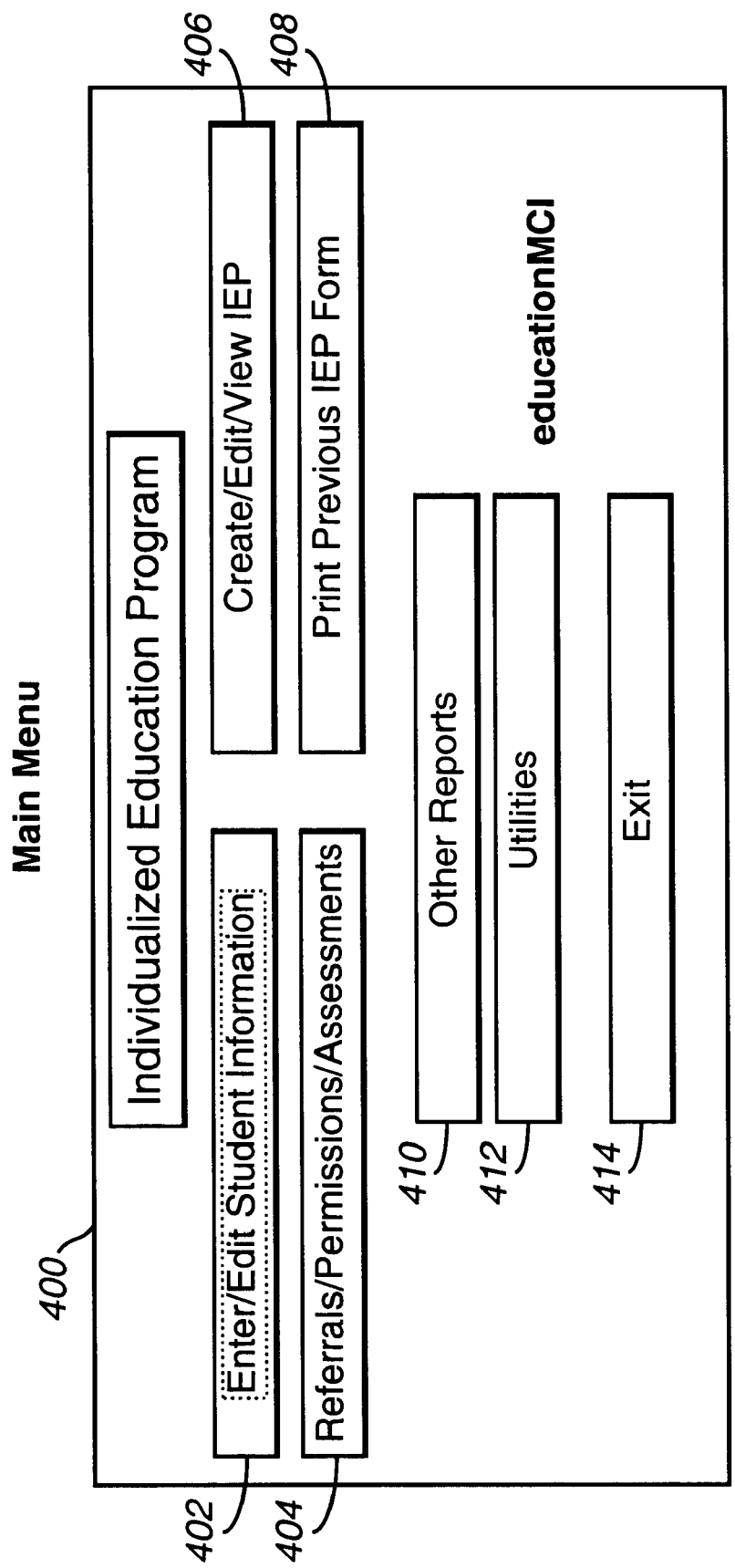
FIG. 4 is an exemplary Main Menu screen of the individual education program tracking system in accordance with the present invention.

FIG. 2 is a flow chart 200 detailing an exemplary embodiment of the logic for creating a new individual education plan for a student in accordance with the present invention. When a user logs onto the individual education program tracking system, either via server 10 or any of the client computers 12 illustrated in FIG. 1, the individual education program tracking system main menu, illustrated in FIG. 4, is brought up on the monitor of the computer. This initial step is represented by element 202 in the flow chart 200.

The creation of an individual education plan begins with the generation of a student profile which is stored in the individual education program database 18 illustrated in FIG. 1. Once the student profile is generated, then an individual education plan may be created for the particular student. In order to create a new individual education plan for a student, the Create/Edit/View IEP option in the main menu is selected. The individual education program tracking system main menu and all of its options are discussed in detail subsequently. The step of generating a student profile is represented by element 204 in the flow chart 200. This step comprises prompting the user of the system for certain basic information regarding the student. This information typically includes the student's name, age, birthdate, grade, address, parent(s) name, guardian's name, primary language, disabilities or talents. A unique student identifier may be entered by the user of the system or assigned by the system. The information is entered via a screen, illustrated in FIG. 5, brought up on the monitor via the system through the selection of the Enter/Edit Student Information option of the main menu. A detailed description is given subsequently.

The next step implemented by the system comprises saving the student information as a record in the individual education program database 18 illustrated in FIG. 1. This step is represented by element 206 in the flow chart 200.

The next step implemented by the system comprises allowing a user of the system to select a student and create an individual education plan for that student. This step is represented by element 208 in the flow chart 200. As is mentioned above and described in detail subsequently, a new individual education plan may be created by selecting the Create/Edit/View IEP option from the main menu. In the exemplary embodiment, there are three types of individual education plan records which may be created when the Create/Edit/View IEP option is selected. A first type is created for an initial individual education plan. A second type is created for annual reassessments of the student's individual education plan process. A third type is created for triennial reassessments, in which a student's eligibility for an individual education plan is reevaluated. Detailed descriptions of each of these record types and their function are given subsequently.

The next step implemented by the system comprises a decision to determine if an individual education plan already exists for the particular student. This step is represented by element 210 in the flow chart 200. If an individual education program does exist for the particular student, a warning is given to the user of the system that there is an existing individual education plan. If the user chooses to continue, the previous individual education plan remains in the file, but a new "current" individual education plan is created. The warning step is represented by element 212 in the flow chart 200. If an individual education plan does not exist, the next step implemented comprises displaying the selected student's information stored in the individual education program database 18, illustrated in FIG. 1, and allowing the user of the system to edit/modify the data. This step is represented by element 214 in the flow chart 200.

The next step implemented by the system comprises allowing the user of the system to enter additional data for an individual education plan, such as skills assessments. This step is represented by element 216 in the flow chart 200. The next step implemented by the system comprises storing the individual education plan information in the individual education program database 18 illustrated in FIG. 1. This step is represented by element 218 in the flow chart 200.

Figure 3:
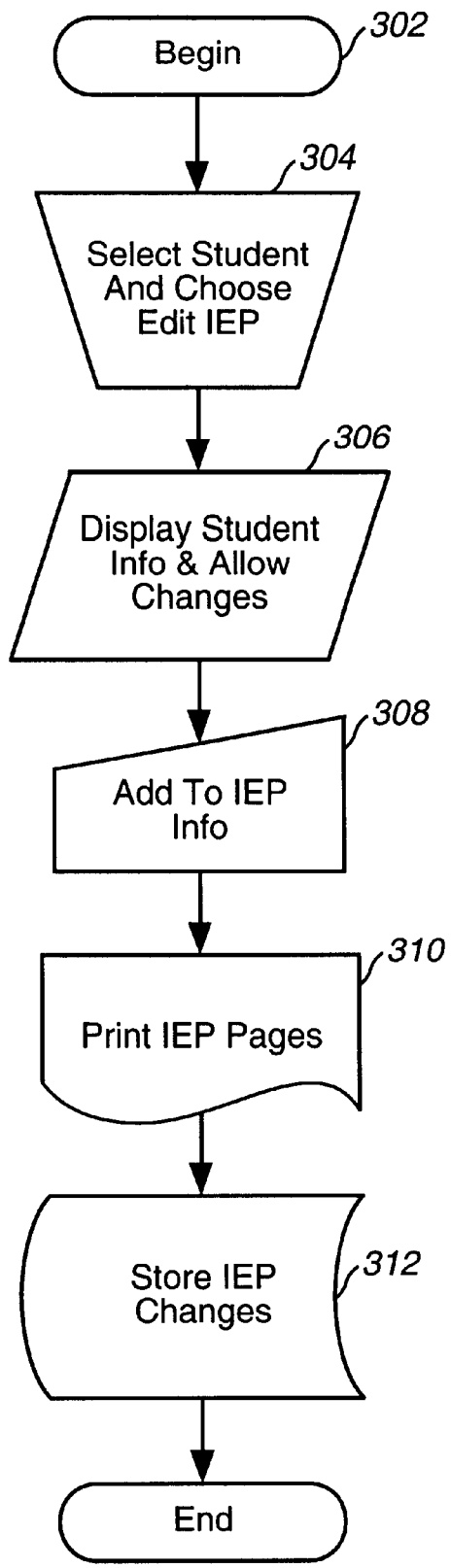
FIG. 3 is a flow chart of the logic for editing an existing individual education plan for a student in accordance with the present invention.

FIG. 3 is a flow chart 300 detailing an exemplary embodiment of the logic for editing an existing individual education plan for a student in accordance with the present invention. After an individual education plan is created, FIG. 2 logic, it may be edited by a teacher, school administrator, or other educational professional and authorized user, to provide their input on the student's individual education plan. Then, in accordance with the standard business process, a staffing meeting is held with the parents or guardian, teacher, school administrator and other educational professionals to discuss and approve the individual education plan. During the staffing meeting, the individual education plan may be edited, via the system, to reflect the outcome of the staffing meeting.

When a user logs onto the individual education program tracking system, he must enter a login ID and password. Based on that login, the user is allowed to see student information and individual education plans that have been previously entered into the system. Administrators would not be allowed to see individual student records but would be allowed to print statistical reports. This step is represented by element 302 in the flow chart 300. The user then selects the Create/Edit/View IEP option from the main menu, illustrated in FIG. 4 and the Create/Edit/View IEP screen, illustrated in FIG. 17 and described in detail subsequently, is brought up on the computer monitor. In the initial step of the process for editing an existing individual education plan, the user of the system is presented with the Create/Edit/View IEP screen of FIG. 17.

Figure 18:
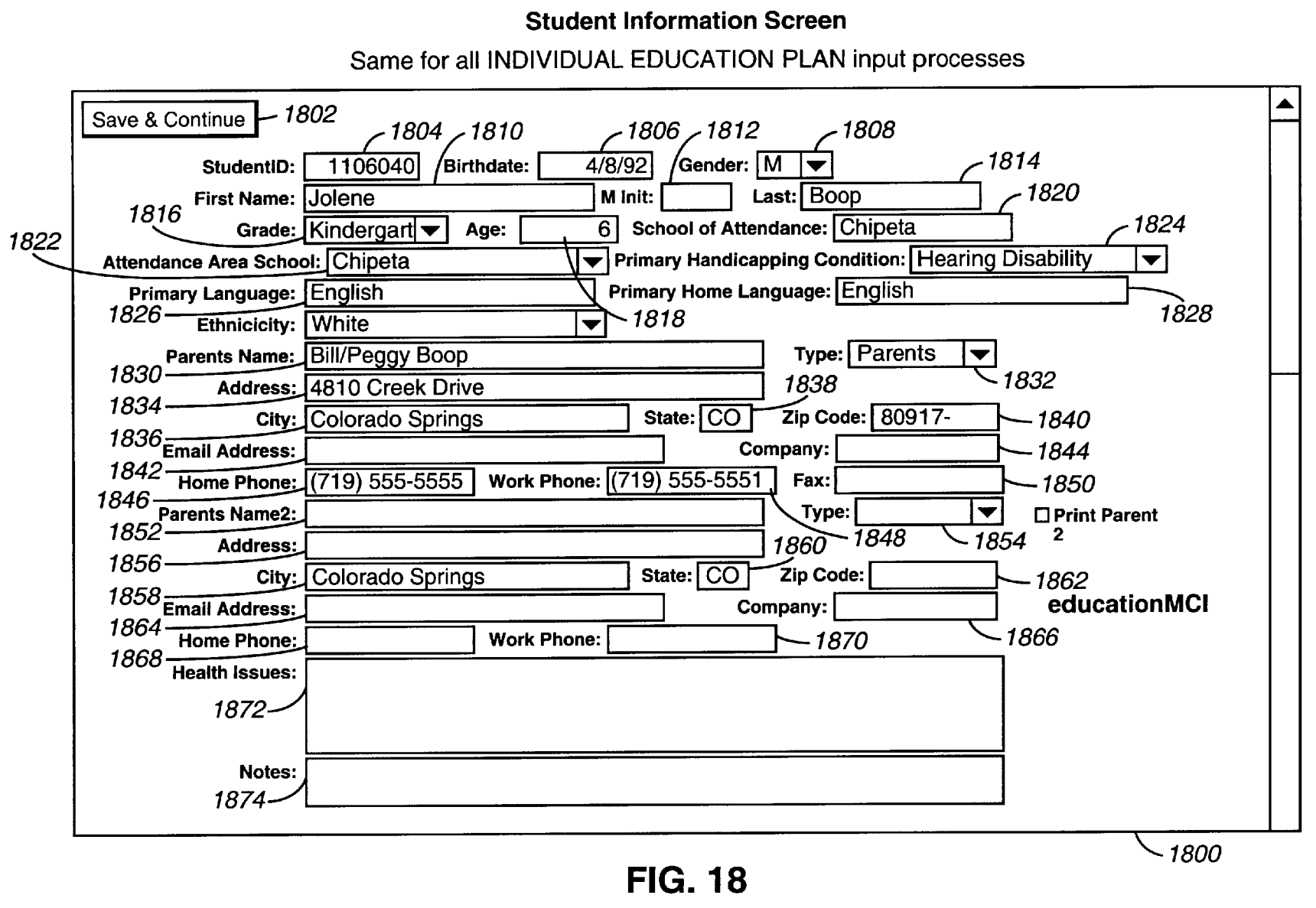

The next step in the process for editing an existing individual education plan comprises allowing the user of the system to select a student from a list of student records stored in the individual education program database 18, illustrated in FIG. 1, and then to select the Edit Current IEP option from the Create/Edit/View IEP screen illustrated in FIG. 17. When the user selects this option, the system automatically brings up the student's current IEP record and, as mentioned above and described in detail subsequently, there are three types of IEP records. This step is represented by element 304 in flow chart 300. The next step in the process for editing an existing individual education plan comprises displaying the student's information screen for the current individual education plan on the computer monitor. This screen, which is discussed in detail subsequently, is illustrated in FIG. 18. Changes in the student information may be made on this screen by the users of the system. This step is represented by element 306 in the flow chart 300. In the next step, represented by element 308 in the flow chart 300, additional information may be added to the individual education plan record by the user of the system. In the next step, represented by element 310 in the flow chart 300, the user of the system is provided with the capability to print out the individual education plan. As many copies as desired may be printed to distribute to parents, guardians, teachers and other participants in a staffing meeting. In the next step, represented by element 312 in the flow chart 300, the individual education plan record is stored, with all changes, in the individual education program database 18 illustrated in FIG. 1.

As stated above, the individual education program tracking system main menu is illustrated in FIG. 4. The main menu screen 400 comprises a plurality of options which may be selected by a user of the system. In the exemplary embodiment, the main menu screen 400 offers seven options; namely, the Enter/Edit Student Information option 402, the Referrals/Permission/Assessments option 404, the Create/Edit/View IEP option 406, the Print Previous IEP Form option 408, the Other Reports option 410, the Utilities option 412, and the Exit option 414. The Print Previous IEP Form option 408, the Other Reports option 410, the Utilities option 412 and the Exit option 414 are self-explanatory options. Accordingly, only a brief explanation of these options is given. Selection of the Print Previous IEP Form options 408 brings up a student list screen that allows a user of the system to print out an existing individual education program record. Selection of the Other Reports option 410 brings up a sub-menu offering various statistical and demographic reports. Selection of the Utilities option 412 brings up a sub-menu offering Export and Restore functions. Selection of the Exit option 414, as the name suggests, results in exiting from the system.

Before an individual education plan may be created, a student profile is created by entering information about the student. The user of the system selects the Enter/Edit Student information option 402 from the main menu 400. Selecting this option brings up a student information screen. Via the student information screen, the user of the system may enter all pertinent information relating to the particular student. An exemplary student information screen 500 is illustrated in FIG. 5. The basic student information which may be entered using the student information screen 500 includes the student's name, address, phone number, school, grade, primary student language, primary home language, date of birth, gender, handicapping condition, school of attendance, school providing special educational services, educational director, regular education teacher, custodial parent or guardian information and non-custodial parent information. The user of the system simply enters this information in the appropriate fields on the screen 500. As discussed above, the step of creating a student profile is represented by element 204 in the flow chart 200 of FIG. 2. Essentially, the user of the system may, through screen 500, create a student information record for new students or edit an existing student information record for students. New and modified student information records are saved to the individual education program database 18, illustrated in FIG. 1, as described above with respect to the step represented by element 206 of the flow chart 200 illustrated in FIG. 2. Once the records are saved, the individual education program tracking system returns control to the main menu 400.

The Referrals/Permission/Assessments option 404 provides for the creation of the forms that may be required prior to creating an individual education plan for a student as well as throughout the entire individual education plan administration process. Typically, a state has requirements that must be met before a student can enter a special education plan, such as that provided by an individual education plan. These requirements include an assessment of a student's skills and parental (guardian) authorization. The individual education program tracking system automatically generates the forms for complying with these regulatory requirements. Once the requirements have been met, then an individual education plan may be created for a student.

When a user of the system selects the Referrals/Permission/Assessments option 404, a Referrals/Permission/Assessments form screen is brought up on the monitor of the computer the user is currently utilizing. An exemplary Referrals/Permission/Assessments screen 600 is illustrated in FIG. 6. The Referrals/Permission/Assessments screen 600 offers the user of the system a plurality of options. In the exemplary embodiment, there are five options for generating forms from which the user of the system may select. Prior to selecting a particular option, the user of the system first selects a particular student.

Selection of the Initial Referral option 602 results in bringing up a screen for the generation of an Initial Referral Form. This form is typically completed by the student's regular education teacher. The form is utilized to make a request that a student be evaluated for Special Education and lists the reasons upon which the request is being made. FIG. 7 illustrates an exemplary Initial Referral form screen 700. The information which automatically populates screen 700 includes the student's name and the referral date. The information which is preferably provided by the referring teacher includes responses to the following exemplary questions: What are your concerns and behavioral observations about the student; What strategies have been tried to improve the situation; How long were the strategies in place and state the outcomes of these interventions; What contact has been made with parents/guardian; and What questions would you like addressed by the assessment team. In addition to this information, the referring individuals name and position are also preferably entered on this screen 700. Fields 702, 704, 706, 708, 710, 712 and 714 are provided on screen 700 for the entry of this information. The information entered on this screen 700 is permanently tracked by the system. FIG. 8 illustrates a printout of an exemplary Initial Referral form 800 created using the Initial Referral screen 700. It is important to note that these questions are for illustrative purposes. Each school district and/or each state may have a predefined set of questions.

The second option is the Initial Assessment permission option 604. Selection of the Initial Assessment Permission option 604 results in bringing up a screen for the generation of an Initial Assessment Permission form. This is a form that must be signed by the parent(s) or guardian of the student. This form gives permission for the evaluation of the student to take place. FIG. 9 illustrates an exemplary Initial Assessment Permission form screen 900. The information which automatically populates screen 900 includes the student's name and the main phone number for the evaluating school. The user of the system enters the school contact in field 902 on the screen 900. The user may then print out an Initial Assessment Permission form by selecting the Print option. An exemplary Initial Assessment Permission form 1000 is illustrated in FIG. 10. This form 1000 must be signed by the parent(s) or guardian of the student prior to performing an assessment on the student. The results of an assessment determines if the student qualifies for a particular individual education plan.

The third option is the Notice of Meeting option 606. Selection of the Notice of Meeting option 606 results in bringing up a screen for the generation of a Notice of Meeting form. This form is provided to the student's parent (s) or guardian, the student's teachers and other potential staffing meeting participants to notify them of the staffing meeting in which a determination of the student's eligibility for an individual education plan is made. FIG. 11 illustrates an exemplary Notice of Meeting form screen 1100. When the user selects the student's name from the list and chooses to create a Notice of Meeting form, he or she will be asked if it is the first notice to be sent. If the answer is "yes", the system will reset a counter to 1 (one). Otherwise, the counter is incremented by 1 (one). This allows special education personnel to track how many notices have been sent. The information which automatically populates screen 1100 includes the student's name, the number of the notice, the date of the notice, the school contact and the school's main phone number. The user of the system enters various information, including those individuals who are believed to be needed at the meeting, date of the meeting, time of the meeting, location of the meeting and the type of evaluation (annual, initial or triennial) in fields 1102, 1104, 1106, 1108 and 1110 respectively. The user of the system may print out a Notice of Meeting form by selecting the print option. An exemplary Notice of Meeting form 1200 is illustrated in FIG. 12. The Notice of Meeting form 1200 is sent to each of the parties designated for confirmation of their attendance.

The fourth option is the Notice of Reassessment option 608. Selection of the Notice of Reassessment option 608 results in bringing up a screen for the generation of a Notice of Reassessment form. This form is sent to the student's parent(s) or guardian to inform them that their child is being reassessed for Special Education service. FIG. 13 illustrates an exemplary Notice of Reassessment form screen 1300. The information which automatically populates screen 1300 includes the student's name and the main phone number for the school. The user of the system enters various information, including the name and title of the contact at the school. Each year the student is reassessed to track their progress. Students need not be reassessed every year to qualify for an individual education plan. Yearly reassessments are to track a student's progress. Continued qualification for individual education plans is based on reassessments done every three years or triennial reassessments. The school contact and telephone number information on the Notice of Reassessment form screen 1300 is verified by the user of the system to make sure it is correct prior to the Notice of Reassessment form being printed and delivered. An exemplary Notice of Reassessment form 1400 is illustrated in FIG. 14.

The fifth option is the Staffing Report & Student Data Form option 610.

Selection of the Staffing Report & Student Data Form option 610 results in bringing up a screen for the generation of a Staffing Report & Student Data Form. This form is an official form that is sent to the state department of education with each student's demographic data. FIG. 15 illustrates an exemplary Staffing Report & Student Data Form screen 1500. The information which automatically populates screen 1500 includes the student's name, date of birth, gender, school grade level, school of services, service begin date, primary handicapping condition, ethnicity and setting for services offered. The user of the system enters various information, including student status (new student, carryover student), tuition paid by, and staff providers. An exemplary Staffing Report & Student Data Form 1600 is illustrated in FIG. 16.

Referring back to the main menu screen 400 of FIG. 4, the Create/Edit/View IEP option 406, once selected by the user of the system, brings up a student list screen that allows the user of the system to create a new initial individual education plan record, create a new annual individual education plan record, create a new triennial/re-evaluation individual education plan record, edit an existing individual education plan record, or lock an existing individual education plan record. When the user of the system selects the Create/Edit/View IEP option 406 from the main menu screen 400, a Create/Edit/View IEP screen is brought up on the monitor of the computer. An exemplary Create/Edit/View IEP screen 1700 is illustrated in FIG. 17. In the exemplary embodiment, the Create/Edit/View IEP screen 1700 provides the user of the system with five options from which to select. The user of the system first selects a student. Once a student is selected, the user of the system has the choice to create a new or edit an existing individual education plan record. A new individual education plan is created when an initial individual education plan is created, as well as with annual and triennial reassessments. The step of creating an individual education plan is represented by element 208 in the flow chart 200 of FIG. 2. It should be noted that this menu may be modified in an alternate embodiment of the individual education program tracking system to streamline these options and become more user friendly.

The Create New Initial option 1702 allows the user of the system to edit basic student information and then proceed to a screen to input information needed for an Initial IEP evaluation and staffing meeting. The Create New Annual option 1704 allows the user of the system to edit basic student information and then proceed to a screen to input information needed for an Annual IEP staffing meeting. The Create New Triennial/Reassessment option 1706 allows a user of the system to edit basic student information and then proceed to a screen to input information needed for a Triennial/Reassessment IEP evaluation. The Edit Current IEP option 1708 allows a user of the system to edit basic student information and then proceed to a previously created individual education plan record to add, change, or complete individual education plan information. The Lock This IEP option 1710 is only selected when the staffing process is complete. This option assures that information in the individual education program database 18, illustrated in FIG. 1, matches the information on the official copy of the printed individual education plan form.

When the user of the system selects the Create New Initial option 1702, the Create New Annual option 1704, or the Create New Triennial option 1706, then the selected student's Student Information Screen is brought up on the monitor. An exemplary Student Information screen 1800 is illustrated in FIG. 18. The user of the system may edit any of the data fields in the screen 1800 prior to proceeding with creating a new individual education plan. The Student information screen may comprise any number of fields, including a student ID field 1804, a birthdate field 1806, a gender field 1808, first, middle and last name fields 1810, 1812, 1814, a grade field 1816, an age field 1818, a school field 1820, a district field 1822, a primary handicapping condition field 1824, a primary language field 1826, a primary home language field 1828, a parents name field 1830, a type field 1832, address city, state and ZIP code fields 1834, 1836, 1838, 1840, an e-mail address field 1842, a company field 1844, home, work and fax number fields 1846, 1848, 1850, a second parents name field 1852, a type field 1854, address, city, state and ZIP code fields 1856, 1858, 1860 1862, an e-mail address field 1864, a company field 1866, home and work phone number fields 1868, 1870, a health issues field 1872 and a notes field 1874. When the user selects the Save and Continue option 1802, the system presents a screen in accordance with the users selection from the options presented on screen 1700.

If the user of the system selected the Create New Initial option 1702, the user is presented with a Create New Initial screen. An exemplary Create New Initial screen 1900 is illustrated in FIGS. 19a, b, c. This screen 1900 is used to create a new initial individual education plan for a student. The student's name is automatically populated in the student name field 1902 from the user's selection in FIG. 17. An indicator 1904 that this is a Create New Initial form is checked to eliminate confusion because this screen form is similar to the Create New Annual and Create New Triennial/Reassessment forms discussed subsequently. The Create New Initial screen 1900 comprises the fields for all needed information for an initial individual education plan record. This screen 1900 provides options to go to a signature screen (FIG. 22), a Woodcock-Johnson score conversion screen (FIG. 23), a Goals and Objectives screen (FIG. 24) and a Printing screen (FIG. 26). Each of these screens is described in detail subsequently If the user of the system selects the Create New Annual option 1704, the user is presented with a Create New Annual screen. It should be noted that previous individual education plans for the student will not be deleted from the system until three (regardless of type) are already contained within. At that time, the oldest of the three previous plan records will be deleted when the new one is added. This capability is the same for Create New Triennial. An exemplary Create New Annual screen 2000 is illustrated in FIGS. 20a, b. This screen 2000 is used to create a new individual education plan record to reflect the results of an annual reassessment. The student's name is automatically populated in the student name field 2002 from the user's selection in FIG. 17. An indicator 2004 that this is a Create New Annual form is checked to eliminate confusion as stated above. This screen 2000 is shorter that the Create New Initial screen 1900 because an annual reassessment is intended to simply track a student's progress and not to evaluate their eligibility for an individual education plan. This screen 2000 comprises the fields for all needed information for an annual individual education plan record. This screen 2000 provides options to go to a signature screen (FIG. 22), a Woodcock-Johnson score conversion screen (FIG. 23), a Goals and Objectives screen (FIG. 24) and a Printing screen (FIG. 26).

If the user of the system selects the Create New Triennial option 1706, the user is presented with a Create New Triennial/Reassessment screen. An exemplary Create New Triennial/Reassessment screen 2100 is illustrated in FIGS. 21a, b, c. This screen is used to create a new individual education plan record to reflect the results of a triennial reassessment, in which a student's eligibility for an individual education plan is re-evaluated. Therefore, this form is similar to the Create New initial screen 1900. The student's name is automatically populated in the student name field 2102 from the user's selection in FIG. 17. An indicator 2104 that this is a Create New Triennial/Reassessment form is checked to eliminate confusion as stated above. This screen 2100 comprises the fields for all needed information for a triennial/reassessment individual education plan record. This screen 2100 provides options to go to a signature screen (FIG. 22), a Woodcock-Johnson score conversion screen (FIG. 23), a Goals and Objectives screen (FIG. 24) and a Printing screen (FIG. 26).

Each of the screens 1900, 2000, 2100 illustrated in FIGS. 19a, b, c, 20a, b, 21a, b, c respectively, includes options for saving the new individual education plan record, Save Record 1906, 2006, 2106, printing the individual education plan form, Print IEP Form 1908, 2008, 2108, closing the individual education program record, Close Form 1910, 2010, 2110, checking for signatures, Check Sigs 1912, 2012, 2112 and using a spell checker, √, 1914, 2014, 2114. If the Close Form option 1910, 2010, 2110 is selected, the system automatically saves the form and then returns the user to the main menu screen 400 illustrated in FIG. 4. If the Check Sigs option 1912, 2012, 2112 is selected, the system presents the exemplary signature screen 2200 illustrated in FIG. 22. This screen 2200 is used to record the people involved in a staffing meeting. Typically, handwritten signatures may or may not be required on individual education plan forms. This screen 2200 may be used in cases where signatures are not required, but rather to simply keep track of the people involved. This screen comprises a plurality of fields 2202 for listing names. This screen 2200 is automatically populated with the student's name in name field 2204 and the student's birthdate in the birthdate field 2206.

Referring back to FIG. 17, if the user of the system selects the Edit Current IEP option 1708, then the most current individual education plan record is presented, regardless if it is an Initial, Annual or Triennial individual education plan record. The user of the system may then make changes and save the individual education plan record. If the user selects the Lock This IEP option 1710, the system locks the individual education plan record in the individual education program database 18, illustrated in FIG. 1, from any further modifications. This option is used when an individual education plan has been finalized and approved during a staffing meeting to ensure no further changes can be made. As such, a warning and option to cancel is first presented when this option 1710 is selected.

In a preferred embodiment, the individual education program tracking system provides automatic scoring capabilities. Scoring provides a means for helping determine if a student qualifies for a particular individual education plan. On the Create New Initial screen, FIGS. 19a, b, c and the Create New Triennial screen, FIGS. 21a, b, c, there are fields for entering test scores, entering IQ measure, and selecting an IQ methodology. By selecting the Enter Scores option 1916, 2116, the user of the system may enter test scores that represent a student's Standard Score Quotient for Reading, Mathematics and Writing tests. Selecting this option 1916, 2116 brings up the Woodcock-Johnson Score Conversion screen 2300 illustrated in FIG. 23. As illustrated in FIG. 23, the user of the system enters a student's test scores in the left hand column fields 2302. The exemplary screen 2300 illustrated in FIG. 23 has values of 50 and 70 for Reading, 60 and 45 for Mathematics and 88 and 100 for Writing. The system then automatically performs a score conversion, such as a Woodcock-Johnson score conversion and places the results in the right hand column fields 2304. A score conversion may follow any of the various methodologies available, of which Woodcock-Johnson is one example, and is performed by the system via table queries. In the example illustrated, the conversion yields values of 1 and 4 for a sum of 5 for Reading, values of 2 and 1 for a sum of 3 for Mathematics, and values of 7 and 10 for a sum of 17 for Writing. The system then uses the sums to perform a table lookup to retrieve Standard Score Quotients for reading Mathematics and Writing and placing them in fields 2306, 2308 and 2310. In the example shown, the Standard Score Quotients are 55 for Reading, 52 for Mathematics and 91 for Writing. When the user selects the Return To IEP option 2312, the Standard Score Quotients are automatically populated in the corresponding fields 1924, 1926, 1928, 2124, 2126, 2128 of the Create New Initial screen, FIGS. 19a, b, c, or the Create New Triennial/Reassessment screen FIGS. 21a, b, c. The Conversion screen 2300 is automatically populated with the student's name and ID in the name and ID fields 2314, 2316.

The user of the system may also use one or more IQ measures. In the exemplary embodiment, fields for three methodologies of IQ measure are provided: FULL SCALE IQ, VERBAL IQ, and PERFORMANCE IQ. The user of the system the selects the IQ methodology that he/she desires to use to qualify the particular student. The system then performs the scoring process. First, the system uses the IQ methodology selection and the user input IQ score for that methodology to perform a table lookup for a Regression Cut-off Value for Reading, Mathematics and Writing. The Regression Cut-off Values are placed in data fields 1930, 1932, 1934, 2130, 2132, 2134. The Regression Cut-off value specifies the maximum Standard Score Quotient value that a student must have to qualify for a special education individual education program. Second, the system determines if the student's Standard Score Quotient for each area falls below a mean value by two standard deviations or more. For example, it may be that a mean value of a Standard Score Quotient is 100, and a standard deviation is 15. If a student's Standard Score Quotient for Reading is 70 or below, the system will place a YES indicator in the Reading field 1936, 2136. The Math and Writing fields are 1938, 1940, 2138, 2140.

The methods described above in determining a student's qualifications for an individual education plan are specifically designed for special education individual education plan, in which to qualify, a student's score must fall below a certain threshold. It should be obvious that these methods may be modified to qualify students for other types of individual education plans, such as an individual education plan for gifted and talented students.

In a preferred embodiment, the individual education program tracking system may provide an individual education plan form which may be used to specify goals and services for a student. Referring to FIGS. 19c, 20b and 21c, each new individual education program screen has option selections for Fill in Goals 1918, 2018 and 2118 and Fill in Services 1920, 2020, 2120.

When the Fill in Goals option 1918, 2018 and 2118 is selected, the system presents the exemplary Goals screen 2400 illustrated in FIG. 24. This screen 2400 is provided for each goal entered. When a goal is entered, the user of the system selects the Add New Goal option 2402. This saves the goal just entered and presents a new Goals screen for adding another goal. Each goal is saved and stored with the individual education program form from which the Goal screen 2400 was called. When all goals have been entered, the user selects the Return to IEP option 2404, which takes the user of the system back to the new individual education program screen 1900, 2000, 2100 from which the user started.

When the Fill in Services option 1920, 2020, 2120 is selected, the system presents the exemplary Services screen 2500 illustrated in FIG. 25. The user of the system may enter one or more services in this screen 2500. A service is provided to a student as part of their individual education plan. For example, speech therapy may be one service, a special education class in reading may be another service. There is also a place 2504 at the bottom of this screen 2500 to indicate if the student requires transportation as a service, such as may be needed for physically disabled students. Each service is saved and stored with the individual education plan form screen from which the Services screen 2500 was called. When all services have been entered, the user selects the Return to IEP option 2502, which takes the user back to the new IEP form 1900, 2000, 2100 from which they started.

Another feature of individual education program tracking system is that it provides several "Stop" options 1922, 2022, 2122 on each of the new individual education program forms (FIGS. 19, 20, 21). During a staffing meeting, when an individual education plan is being created, a situation may arise in which the individual education plan process must be stopped. For example, a disagreement may arise that may require further investigation beyond the time allocated for a staffing meeting. In this case, the "Stop" option may be selected at the point in an individual education program form that is currently being addressed. When the "Stop" option is selected, the individual education program tracking system saves the form as is, and places a marker at the point where the button was selected. A marker is simply a pointer to the place in the individual education program data record that was last completed. Then, when the process is continued, the users may begin where they left off.

From the main menu shown in FIG. 4, the user may select to print an individual education plan form. The individual education program tracking system brings up a student list, the user selects a student, and individual education program tracking system presents the screen shown in FIG. 26. The user may also select this option from a Create New IEP screen (FIGS. 19, 20, 21), each of which has a "Print IEP Form" option. The Print IEP Form screen in FIG. 26 allows a user to select which pages of an individual education program form they desire to print.

Attached hereto as an appendix is an actual printout of an individual education plan form. This form is printed by the individual education program tracking system using data entered into individual education plan forms. These include assessments, skills, needs, goals, services, scoring and a parental consent form. The last page is included for information on parental/guardian legal rights.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. A method for administrating individual education plans comprising:
   generating student information records for students being considered for participation in an individual education plan;
   creating individual education plan records for each student based upon predetermined qualification criteria, including
      obtaining qualification data for each of the students,
      determining which type of services are to be provided to each of the students as part of an individual education plan based upon the qualification data, and
      storing the qualification data and an indication of the services to be provided to each of the students in a database; and
   generating forms and reports for implementing individual education places for qualified students, the forms and reports complying with regulatory guidelines for implementing individual education plans, and wherein the forms and reports also include a permission form to be signed by a person giving permission for an evaluation of a student to occur.

2. The method for administering individual education plans according to claim 1 further comprising assessing student's progress in individual education plans.

3. The method for administering individual education plans according to claim 1, wherein the step of creating individual education plan records further comprises setting goals for each student based on the qualification data and storing the goals in the database.

4. The method for administering individual education plans according to claim 1, wherein the step of creating individual education plan records further comprises setting objectives for each student based on the qualification data and storing the objectives in the database.

5. The method for administering individual education plans according to claim 1, wherein the step of generating forms and reports further comprises creating forms for reviewing students and determining the eligibility of students.

6. The method for administering individual education plans according to claim 2, wherein the step of generating student information records comprises:
   generating a unique student identifier for each student being considered for participation in an individual education plan;
   inputting information concerning each student being considered for participation in an individual education plan, including each student's personal data and educational data; and;
   storing the information in a database.

7. The method for administering individual education plans according to claim 2, wherein the step of creating individual education plan records comprises creating an initial individual education plan record for new students.

8. The method for administering individual education plans according to claim 2, wherein the step of creating individual education plan records comprises creating an annual individual education plan record for monitoring students in an individual education plan.

9. The method for administering individual education plans according to claim 2, wherein the step of creating individual education plan records further comprises creating a triennial individual education plan record for evaluating a student's progress in an individual education plan.

10. The method for administering individual education plans according to claim 2, wherein the step of assessing students progress in individual education plans comprises retesting a student to obtain new qualification data.

11. The method for administering individual education plans according to claim 2, wherein the step of assessing students' progress in individual education plans comprises verifying student information.

* * * * *